United States Patent [19]

Fukumura

[11] Patent Number: 5,254,650
[45] Date of Patent: Oct. 19, 1993

[54] PROCESS FOR THE PREPARATION OF STYRENE OR STYRENE DERIVATIVE-CONTAINING COPOLYMERS

[75] Inventor: Takumi Fukumura, Asa, Japan

[73] Assignee: Kayaku Akzo Corporation, Tokyo, Japan

[21] Appl. No.: 855,156

[22] Filed: Mar. 20, 1992

Related U.S. Application Data

[63] Continuation of Ser. No. 652,382, Jan. 31, 1991, abandoned, which is a continuation of Ser. No. 384,377, Jul. 24, 1989, abandoned.

[30] Foreign Application Priority Data

Jul. 22, 1988 [JP] Japan .............................. 63-181498
Jul. 22, 1988 [JP] Japan .............................. 63-181499

[51] Int. Cl.$^5$ .......................... C08F 4/36; C08F 12/08
[52] U.S. Cl. ................................ 526/232.3; 526/232; 526/307.8; 526/312; 526/318.6; 526/329.2; 526/340; 526/342; 430/137
[58] Field of Search ................. 526/232.3, 232.5, 342, 526/232, 329.2, 340

[56] References Cited

U.S. PATENT DOCUMENTS

| | | | |
|---|---|---|---|
| 3,342,872 | 9/1967 | Gerritsen et al. | 260/610 |
| 3,357,964 | 12/1967 | Gulpen et al. | 260/93.5 |
| 3,950,432 | 4/1976 | Sanchez | 260/610 R |
| 4,560,735 | 12/1985 | Nakagawa et al. | 526/342 X |
| 4,782,127 | 11/1988 | van Nuffel | 526/329.2 |

FOREIGN PATENT DOCUMENTS

| | | |
|---|---|---|
| 0002035A1 | 5/1979 | European Pat. Off. . |
| 0107795A2 | 5/1984 | European Pat. Off. . |
| 1020297 | 2/1966 | United Kingdom ............. 526/232.3 |

*Primary Examiner*—Fred Teskin
*Attorney, Agent, or Firm*—Ralph J. Mancini; Louis A. Morris

[57] ABSTRACT

A process for the copolymerization of styrene or α-methylstyrene with an unsaturated acid derivative is disclosed. The process is carried out in the presence of a tetrafunctional organic peroxide and produces copolymeric products having significantly improved properties.

14 Claims, No Drawings

PROCESS FOR THE PREPARATION OF STYRENE OR STYRENE DERIVATIVE-CONTAINING COPOLYMERS

This is a continuation of application Ser. No. 652382 filed Jan. 31, 1991, which is a continuation of application Ser. No. 384,377 filed on Jul. 24, 1989, both now abandoned.

BACKGROUND OF THE INVENTION

The present invention relates to a process for the preparation of copolymers of styrene or α-methylstyrene with an unsaturated acid derivative, and optionally, additional comonomers.

It has recently been required that the fixing temperature of toners for electrophotographic devices be lowered to reduce the power consumption of these devices. One convenient method for lowering the fixing temperature is to reduce the molecular weight of the toner. However, the use of a low molecular weight compound alone as the toner material has the disadvantage that it causes blocking. Further, the use of a high molecular weight resin is essential for imparting offset properties to a toner. Thus, a resin for a toner must consist of both a low molecular weight part and a high molecular weight part in order to provide fixability at low temperatures, offset properties and anti-blocking properties.

In attempts to obtain an acceptable polymeric material, a polymerization process characterized by the use of a reduced amount of polymerization initiator and a lower polymerization temperature was suggested. However, such process has the disadvantage of taking an uneconomically long time. The use of a difunctional peroxide as the initiator in this process was also proposed, but the process still did not produce satisfactory results. Thus, there is a need for a polymerization process which produces polymeric products suitable for today's needs in the electrophotographic reproduction field.

In another field in which the products of the present invention are useful, it has been required to develop copolymers of a α-methylstyrene having a high thermal deformation temperature, high heat stability, excellent transparency and which are produced with a high degree of polymerization. In this area, copolymerization processes have been employed using t-butylperoxy benzoate, t-butylperoxy acetate and benzoyl peroxide as the polymerization initiator. However, these polymerization initiators are required in large amounts and thus, often cause significant discoloration of the copolymer and providing an unacceptably low degree of polymerization.

Emulsion polymerization was also employed to produce a copolymer with α-methylstyrene having a high degree of polymerization and a high conversion. However, the copolymers prepared by emulsion polymerization have the unavoidable disadvantage that they become contaminated with an emulsifier during the polymerization process resulting in discoloration of the polymer. Thus, there is a need for a polymerization process for producing a α-methylstyrene-containing copolymers which are transparent, have a high degree of polymerization and exhibit excellent thermal resistance.

It has now been found that styrene and α-methylstyrene-containing copolymers suitable for the above-mentioned uses may be prepared by a copolymerization process wherein styrene or α-methylstyrene is copolymerized with an unsaturated acid derivative in the presence of any certain free radical initiators.

The peroxide cross-linking compound used in the present process is disclosed in U.S. Pat. No. 3,342,872 as being suitable for cross-linking of natural and synthetic rubbers to substantially reduce the disagreeable odor associated with such cross-linked rubbers. In addition, U.S. Pat. No. 3,357,964 discloses the peroxide compound used in the present process for use in the polymerization of vinylaromatic monomers such as styrene, α-methylstyrene, vinyltoluene, vinylcarbazole and mixtures of these compounds. It is said that this polymerization process is faster than previous processes and allows one to obtain higher molecular weight polymers. However, these patents do not disclose the use of this peroxide as an initiator for a process such as that of the present invention wherein copolymers of styrene or α-methylstyrene with unsaturated acid derivatives are produced. Further, these patents do not teach or suggest that the significant, unexpected properties of the products of the present process would be obtained by such a process.

A process for the preparation of copolymers of styrene and acrylic acid is disclosed in European Patent Application 0 002 035. In that process, styrene-acrylic acid copolymers are prepared by the mass copolymerization of styrene and acrylic acid in the presence of difunctional peroxide initiators.

Additionally, a process for the preparation of α-methylstyrene/acrylonitrile copolymers by suspension or bulk polymerization is disclosed in European Patent Application 0 107 795. The process is carried out in the presence of a difunctional peroxide initiator.

SUMMARY OF THE INVENTION

Accordingly, the current invention is a process for copolymerizing a polymerization mixture comprising a compound selected from the group consisting of styrene and α-methylstyrene, and a monomeric unsaturated acid derivative, which comprises the step of carrying out the copolymerization process in the presence of an organic peroxide represented by the general formula:

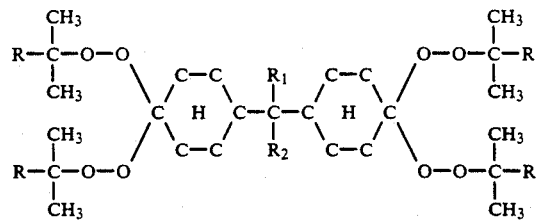

wherein R is a 1-5 carbon alkyl group, or a phenyl group and $R_1$ and $R_2$ are 1-2 carbon alkyl groups.

DETAILED DESCRIPTION OF THE INVENTION

In the present invention, styrene and α-methylstyrene-containing copolymers suitable for the above-mentioned uses may be prepared by a copolymerization process wherein styrene or α-methylstyrene is copolymerized with an unsaturated acid derivative in the presence of a free radical initiator of the following formula (I):

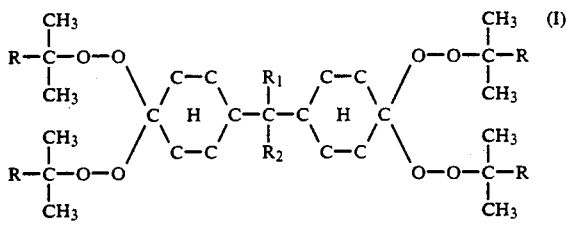

wherein R is a 1-5 carbon alkyl group, or a phenyl group and $R_1$ and $R_2$ are 1-2 carbon alkyl groups. The copolymers produced by this process exhibit significant, unexpected properties which render them particularly useful in the above-mentioned application areas.

Examples of the tetrafunctional peroxide having the formula (I) include
2,2-bis(4,4-di-t-butylperoxycyclohexyl)propane;
2,2-bis(4,4-di-t-amylperoxycyclohexyl)propane;
2,2-bis(4,4-di-t-octylperoxycyclohexyl)propane;
2,2-bis(4,4-di-α-cumylperoxycyclohexyl)propane;
2,2-bis(4,4-di-t-butylperoxycyclohexyl)butane; and
2,2-bis(4,4-di-t-octylperoxycyclohexyl)butane.

These perketals can be easily prepared according to the process disclosed in Japanese patent publication nos. 19013/1965 and 19511/1966. That is, such a perketal can be prepared by reacting a diketone represented by the general formula (II):

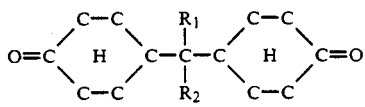

wherein $R_1$ and $R_2$ are 1-2 carbon alkyl groups, with a tertiary hydroperoxide such as t-butyl hydroperoxide, t-amyl hydroperoxide, t-octyl hydroperoxide or cumene hydroperoxide in the presence of an acid catalyst such as sulphuric acid.

The tetrafunctional organic peroxide of the formula I is preferably used in an amount of 0.05 to 3.5% by weight based on the total amount of the monomers to be copolymerized. If the amount of peroxide initiator is less than 0.05% by weight, the conversion in the polymerization process will generally be insufficient for practical use. If the amount of peroxide exceeds 3.5% by weight, the polymerization rate will generally be too high to adequately control the polymerization. Even more preferably, the amount of peroxide is from 0.1 to 3.0% by weight.

Of course, two or more of the organic peroxides represented by the formula I may be simultaneously used in the process of the present invention. Further, one or more peroxides of the formula I may be used together with an organic peroxide other than those represented by the formula I or with an azoic polymerization initiator.

In order to prepare polymers having the superior properties obtained by the process of the present invention, it is preferred to carry out the polymerization process at a temperature not lower than 80° C. and not higher than 125° C. Particularly with α-methylstyrene polymerizations, the preferred upper temperature limit is 120° C. although the process will still be effective at a temperature up to 10° C. above the 10 hour half-life temperature of the peroxide initiator.

The polymerization process may be effected at constant temperature or a multi-stage polymerization method with two or more stages at different temperatures, may be employed. Polymerization at temperatures below 80° C. is possible although it gives low conversion and thus, is of little practical use. Polymerization above 125° C. is also possible, but again the polymerization is too rapid to control and thus provides polymeric products having unsatisfactory physical properties.

According to the present invention it is preferred to use 40-90% by weight of the styrene or α-methylstyrene component. More preferably, at least 50% by weight of styrene is employed, and only up to 80% by weight of α-methylstyrene is used.

The unsaturated acid derivatives useful in the present invention are obtained by the reaction of unsaturated acids such as acrylic acid. Particularly, preferred unsaturated acid derivative monomers for copolymerization with styrene include the unsaturated acid ester monomers. For example, methyl acrylate, ethyl acrylate, isopropyl acrylate, n-butyl acrylate, 2-ethylhexyl acrylate, methyl methacrylate, ethyl methacrylate, isopropyl methacracrylate, n-butyl methacrylate, dimethylaminoethyl methacrylate and diethylaminoethyl methacrylate. Preferably, the unsaturated acid derivatives to be copolymerized with styrene make up 10-50% by weight of the reaction mixture.

The most preferred unsaturated acid derivative for copolymerization with α-methylstyrene is acrylonitrile. The acrylonitrile is preferably employed in an amount of 10-40% by weight.

If desirable, up to 40% by weight of additional comonomers may be used in the polymerization process. Suitable comonomers include styrene (for α-methylstyrene copolymerizations), α-methylstyrene (for styrene copolymerizations), unsaturated acids such as acrylic acid and methacrylic acid; other unsaturated acid derivatives such as acrylonitrile, methacrylonitrile and acrylamide; conjugated dienes such as butadiene and isoprene; vinyltoluene; acrylates such as ethyl acrylate and butyl acrylate; and methacrylates such as methyl methacrylate and butyl methacrylate. More preferably, with styrene polymerizations, comonomers other than unsaturated acid esters are employed in amounts of only up to 20% by weight.

According to the present invention, the polymerization may be carried out by suspension polymerization and bulk polymerization, among others.

The present invention will now be further illustrated by the following examples. The results of styrene polymerizations are shown in Table 1 including comparative examples. The results of α-methylstyrene polymerizations are shown in Table 2 also including comparative examples.

EXAMPLES 1 to 6

Bulk polymerization of st/BA

This polymerization was carried out by the use of an organic peroxide given in Table 1 under the conditions given in Table 1 according to the following process.

Polymerization process:

The polymerization was carried out by the use of a brown ampul having a capacity of 3 cc.

That is, styrene (hereinafter abbreviated to "st") and n-butyl acrylate (hereinafter abbreviated to "BA") each in a predetermined amount were fed into the ampul together with each of the polymerization initiators. The ampul was purged with nitrogen gas and sealed by melting. The resulting ampul was placed on an oil bath adjusted to a predetermined temperature to carry out the polymerization for a predetermined time. After the completion of the polymerization, the ampul was taken out and cooled rapidly. As occasion demands, the contents were taken out and pretreated. Then, the resulting polymerization product was used as a sample for each evaluation.

The amount of the polymerization initiator added is shown by percentage by weight (in terms of pure one) based on the total amount of the monomers used. The ratio of the fed st to the fed BA is shown by weight.

Evaluation method of copolymer:

Conversion into copolymer (%): The amounts of residual st and BA were determined by gas chromatography to calculate the conversion.

Molecular weight (Mw, Mn, Mw/Mn): A calibration curve was prepared by using polystyrene standard to determine the molecular weight of a copolymer according to GPC.

COMPARATIVE EXAMPLES 7 to 10

Bulk polymerization of st/BA

This polymerization was carried out by the use of an organic peroxide given in Table 1 under the conditions given in Table 1 according to the process described above.

The characteristic values of the copolymers obtained in Examples 1 to 6 and Comparative Examples 7 to 10 are shown in Table 1. It can be understood from the results shown in Table 1 that the copolymers prepared by the use of the specific tetra-functional organic peroxide according to the present invention are all superior to those prepared by the use of the mono-, di- and tri-functional organic peroxides in physical properties. Further, it can be also understood that by the present invention a high-molecular weight copolymer is obtained in a high conversion and a short reaction time.

EXAMPLE 11

Suspension polymerization of st/BA 400 g of a 1.5% by weight aqueous solution of polyvinyl alcohol (saponified up to 85%) was fed into a 1-liter autoclave fitted with a stirrer. A mixture comprising 160 g of st, 40 g of BA and 6 g of 2,2-bis(4,4-di-t-butylperoxycyclohexyl)-propane was added to the autoclave under stirring. The contents were kept at 90° C. for 2 hours, at 100° C. for 2 hours and then at 120° C. for 2 hours to carry out the polymerization. After the completion of the polymerization, the polymerization mixture was cooled, washed, dehydrated and dried to obtain a copolymer. The conversion into the copolymer was 99.8% and the weight-average molecular weight (Mw) of the copolymer was 432000 and the number-average molecular weight (Mn) thereof was 18000, while Mw/Mn was 24.0.

COMPARATIVE EXAMPLE 12

Suspension polymerization of st/BA.

The same procedure as that described in Example 11 was repeated except that 1,1-di-t-butylperoxy-3,3,5-trimethylcyclohexane was used instead of 2,2-bis(4,4-di-t-butylperoxycyclohexyl)propane to obtain a copolymer. The conversion into the copolymer was 98.1% and the Mw of the copolymer was 238000 and the Mn thereof was 14000, while Mw/Mn was 17.0.

EXAMPLES 13 to 17

Bulk polymerization of αMS/AN mixture

The bulk polymerization was carried out by the use of various organic peroxides as a polymerization initiator according to the process described below under the conditions given in Table 2. A constant temperature polymerization scheme was employed.

Polymerization process:

The polymerization was carried out by the use of an ampul. Namely, α-methylstyrene (hereinafter abbreviated to "αMS") and acrylonitrile (hereinafter abbreviated to "AN"), each in a predetermined amount and, if desirable, a comonomer were fed into a polymerization

TABLE 1

| Polymerization initiator | | Monomer feed st/BA | Polymerization condition | | Characteristics of copolymer | | | |
|---|---|---|---|---|---|---|---|---|
| | | | | | Conversion | data of GPC | | |
| Peroxide | amount (% by weight) | | temp. (°C.) | time (hr) | (%) | Mw | Mn | Mw/Mn |
| Example | | | | | | | | |
| 1 | 2,2-bis(4,4-di-t-butylperoxy-cyclohexyl)-propane | 0.25 | 75/25 | 100 | 5 | 99.6 | 623000 | 164000 | 3.8 |
| 2 | 2,2-bis(4,4-di-t-butylperoxy-cyclohexyl)-propane | 0.25 | 75/25 | 100 | 7 | 99.0 | 998000 | 285000 | 3.5 |
| 3 | 2,2-bis(4,4-di-t-butylperoxy-cyclohexyl)-butane | 0.25 | 75/25 | 110 | 5 | 88.4 | 604000 | 156000 | 3.9 |
| 4 | 2,2-bis(4,4-di-t-amylperoxy-cyclohexyl)-propane | 0.25 | 75/25 | 105 | 5 | 99.3 | 891000 | 287000 | 3.1 |
| 5 | 2,2-bis(4,4-di-t-octylperoxy-cyclohexyl)-propane | 0.25 | 75/25 | 95 | 5 | 99.1 | 839000 | 254000 | 3.3 |
| 6 | 2,2-bis(4,4-di-dl-α-cumylperoxy-cyclohexyl)-propane | 0.25 | 75/25 | 95 | 5 | 99.2 | 842000 | 248000 | 3.4 |
| Comp. Example | | | | | | | | |
| 7 | t-butylperoxy octoate | 0.25 | 75/25 | 90 | 12 | 96.6 | 307000 | 91000 | 3.4 |
| 8 | di-t-butylperoxy hexahydroterephthalate | 0.25 | 75/25 | 95 | 12 | 98.5 | 558000 | 164000 | 3.4 |
| 9 | 1,1-di-t-butylperoxy-3,3,5-trimethylcyclohexane | 0.25 | 75/25 | 110 | 8 | 97.7 | 316000 | 109000 | 2.9 |
| 10 | tri(t-butylperoxy)triazine | 0.25 | 75/25 | 120 | 12 | 98.3 | 591000 | 179000 | 3.3 | ampul together with a polymerization initiator. This ampul was purged with nitrogen gas and sealed. The resulting ampul was placed on an oil bath adjusted to a predetermined temperature to carry out the polymerization for a predetermined time.

After the completion of the polymerization, the ampul was taken out of the bath and cooled. As occasion demands, the contents were taken out and pretreated.

The resulting polymerization product was used as a sample for each evaluation (analysis and measurement). The amount of the polymerization initiator added is shown by percentage by weight (in terms of pure one) based on the total amount of the monomers used. The ratio of the fed αMS to the fed AN is shown by weight. The temperature scheme of the polymerization was of the constant type in most of the Examples, though it was of the rise type in some of them.

Evaluation method of copolymer:

Conversion into copolymer (%): The amounts of residual αMS and AN were determined by gas chromatography to calculate the conversion.

Reduced viscosity ($\eta_{sp}/C$): The viscosity of a 0.2% solution of a copolymer in N,N'-dimethylformamide was determined at 25° C. by the use of an Ubbelohde viscometer and used as a comparative indication of the molecular weight of the copolymer.

Hue (yellowness index: YI): The yellowness index of a copolymer was determined in a state placed in an ampul by the use of a color difference meter according to the reflection method with a white board. The relation between the YI and the hue of a copolymer (degree of discoloration) is as follows:

| YI | Degree of discoloration of copolymer |
|---|---|
| 5 | colorless and transparent |
| 10 | very pale yellow |
| 40 | pale yellow |
| 60 | yellow |
| 80 | deep yellow |
| 100 | yellowish brown |

Criteria of general evaluation: A copolymer satisfying all of the following three criteria is shown by "good (O)", while a copolymer not satisfying even one of them is shown by "bad (X)".

| Result of evaluation | Hue | Conversion | Reduced viscosity |
|---|---|---|---|
| good or bad | 5 or below (colorless and transparent) | 99.5% or above | 0.67 or above |

EXAMPLES 18 AND 19

Bulk polymerization of αMS/AN mixture

As shown in Table 2, Example 18 corresponds to a case wherein a temperature scheme of the rise type was employed, while Example 19 corresponds to a case wherein two initiators are used simultaneously.

COMPARATIVE EXAMPLES 20 TO 24

Bulk polymerization of αMS/AN mixture

The polymerization described in Example 13 was carried out according to the process described above. In Comparative Examples 20 to 22, organic peroxides other than those defined in the present invention were used, while in Comparative Examples 23 and 24, the polymerization was carried out under the conditions outside of the ideal ranges defined in the present invention.

The physical properties, i.e., conversion, reduced viscosity and hue, of the copolymers prepared in the Examples 13 to 19 and the Comparative Examples 20 to 24 are shown in Table 2 together with the polymerization conditions employed.

TABLE 2

| | Polymerization initiator | | Monomer feed αMS/AN | Polymerization condition | | Characteristics of copolymer | | | General evaluation |
|---|---|---|---|---|---|---|---|---|---|
| | Peroxide | amount (% by weight) | | temp. (°C.) | time (hr) | conversion (%) | reduced viscosity ($\eta_{sp}/C$) | hue (YI) | |
| Example | | | | | | | | | |
| 13 | 2,2-bis(4,4-di-t-butylperoxycyclohexyl)-propane | 0.5 | 70/30 | 105 | 12 | 99.5 | 0.69 | 3 | ⊙ |
| 14 | 2,2-bis(4,4-di-t-butylperoxycyclohexyl)-butane | 0.5 | 70/30 | 105 | 12 | 99.9 | 0.68 | 3 | ⊙ |
| 15 | 2,2-bis(4,4-di-t-amylperoxycyclohexyl)-propane | 0.5 | 70/30 | 105 | 12 | 99.6 | 0.67 | 5 | ⊙ |
| 16 | 2,2-bis(4,4-di-t-octylperoxycyclohexyl)-propane | 0.5 | 70/30 | 100 | 12 | 99.5 | 0.68 | 4 | ⊙ |
| 17 | 2,2-bis(4,4-di-α-cumylperoxycyclohexyl)-propane | 0.5 | 70/30 | 100 | 12 | 99.7 | 0.69 | 5 | ⊙ |
| 18 | 2,2-bis(4,4-di-t-butylperoxycyclohexyl)-propane | 0.5 | 70/30 | 100 × 6 + 110 × 6 temp. rise polymerization | | 99.7 | 0.67 | 5 | ⊙ |
| 19 | 2,2-bis(4,4-di-t-butylperoxycyclohexyl)-propane | 0.25 | 70/30 | 100 | 12 | 99.9 | 0.68 | 4 | ⊙ |
| | di-t-butylperoxy hexahydrophthalate | 0.25 | | | | | | | |
| Comparative Example | | | | | | | | | |
| 20 | benzoyl peroxide | 0.5 | 70/30 | 85 | 12 | 87.4 | 0.37 | 11 | x |
| 21 | di-t-butylperoxyhexahydroterephthalate | 0.5 | 70/30 | 95 | 12 | 98.8 | 0.65 | 4 | x |
| 22 | 1,1-di-t-butylperoxy-3,3,5-trimethylcyclohexane | 0.5 | 70/30 | 105 | 12 | 98.6 | 0.64 | 6 | x |

TABLE 2-continued

| | Polymerization initiator | | Monomer feed αMS/AN | Polymerization condition | | Characteristics of copolymer | | | General evalua- tion |
|---|---|---|---|---|---|---|---|---|---|
| | Peroxide | amount (% by weight) | | temp. (°C.) | time (hr) | conver- sion (%) | reduced viscosity ($n_{sp}$/C) | hue (YI) | |
| 23 | 2,2-bis(4,4-di-t-butylperoxycyclohexyl)- propane | 0.05 | 70/30 | 105 | 12 | 35.4 | 0.67 | 5 | x |
| 24 | 2,2-bix(4,4-di-t-butylperoxycyclohexyl)- propane | 0.5 | 70/30 | 130 | 12 | 97.5 | 0.40 | 30 | x |

EXAMPLE 25

Suspension polymerization of αMS/AN mixture 300 g of deionized water and 4 g of tricalcium phosphate were fed into a 1-liter autoclave fitted with a stirrer. The contents were sufficiently stirred, while bubbling nitrogen gas thereinto. 2 g of 2,2-bis(4,4-di-t-butyl-peroxycyclohexyl)propane, 280 g of αMS and 120 g of AN were fed into the autoclave.

The autoclave was purged with nitrogen gas.

Immediately thereafter, the contents were heated to 100° C. to carry out the polymerization at that temperature for 15 hours. After the completion of the polymerization, the contents were cooled to 40° C., dehydrated and dried to obtain a copolymer. This copolymer was examined for various physical properties. The conversion was 99.6%; the weight-average molecular weight (Mw) was 152000; the thermal deformation temperature was 125° C. and the impact strength was 2.4 kg.cm/cm.

COMPARATIVE EXAMPLE 26

Suspension polymerization of αMS/AN mixture

The same procedure as that described in Example 25 was repeated except that 1,1-di-t-butylperoxy-3,3,5-trimethylcyclohexane was used instead of 2,2-bis(4,4-di-t-butylperoxycyclohexyl)propane to obtain a copolymer. The conversion was 98.9%, the weight-average molecular weight (Mw) was 123000, the thermal deformation temperature was 119° C. and the impact strength was 2.0 kg.cm/cm.

In the Example 25 and Comparative Example 26, the conversion was determined by gas chromatography, the weight-average molecular weight was determined by GPC using polystyrene standard and the thermal deformation temperature and the impact strength were determined according to ASTM-D-648 and ASTM-D-256, respectively.

It can be understood from the results obtained in Examples 13 to 19 that the use of the organic peroxide according to the present invention gives a copolymer of α-methylstyrene which is undiscolored and excellent in transparency and has a high degree of polymerization with a remarkably high conversion as compared with the use of a conventional polymerization initiator. Further, it can be understood that the copolymer of α-methylstyrene prepared by suspension polymerization according to the present invention exhibits not only a high thermal deformation temperature but also a sufficiently high impact strength.

What is claimed is:

1. A process of preparing α-methylstyreneacrylonitrile copolymers which comprises copolymerizing a polymerization mixture which comprises α-methylstyrene, acrylonitrile and at least one tetrafunctional peroxide of the general formula (I):

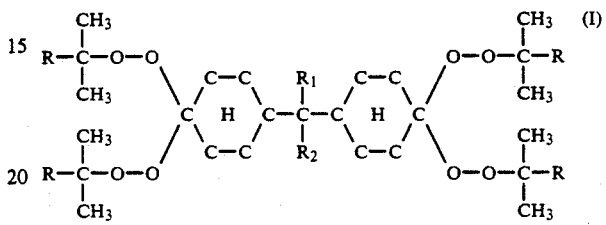

wherein
R is a $C_1$-$C_5$ alkyl group or a phenyl group;
$R_1$ is a $C_1$-$C_2$ alkyl group; and
$R_2$ is a $C_1$-$C_2$ alkyl group.

2. The process of claim 1 wherein said polymerization mixture further comprises at least one comonomer selected from the group consisting of styrene, acrylates, methacrylates and vinyltoluene.

3. The process of claim 2 wherein said polymerization mixture comprises 40-90% by weight of α-methylstyrene and 10-40% by weight of acrylonitrile.

4. The process of claim 3 wherein the polymerization mixture further comprises 0%-40% by weight of said comonomer.

5. The process of claim 4 wherein said polymerization mixture comprises 0.05%-3.5% by weight of said tetrafunctional peroxide.

6. The process of claim 3 wherein the copolymerization is carried out at a temperature of from about 80° C. to about 125° C.

7. A process for preparing a toner resin copolymer which comprises copolymerizing a polymerization mixture which comprises 50-90% by weight 10-50% by weight of at least one unsaturated acid ester monomer selected from the group consisting of methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, dimethylaminoethyl methacrylate and diethylaminoethyl methacrylate; and, at least one tetrafunctional peroxide of the general formula (I):

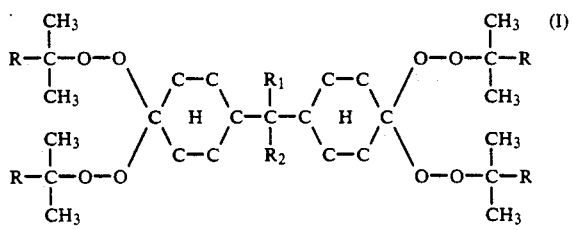

wherein
R is a $C_1$-$C_5$ alkyl group or a phenyl group;
$R_1$ is a $C_1$-$C_2$ alkyl group; and
$R_2$ is a $C_1$-$C_2$ alkyl group.

8. The process of claim 7 wherein said polymerization mixture further comprises at least one comonomer selected from the group consisting of unsaturated acids, acrylonitrile, methacrylonitrile, acrylamide, conjugated dienes, α-methylstyrene and vinyltoluene.

9. The process of claim 8 wherein said polymerization mixture further comprises 0%-20% of said comonomer.

10. The process of claim 9 wherein said polymerization mixture comprises 0.05%-3.5% of said tetrafunctional peroxide.

11. The process of claim 7 wherein the copolymerization is carried out at a temperature of from about 80° C. to about 125° C.

12. In a process for preparing an α-methylstyrene/acrylonitrile copolymer by copolymerizing a polymerization mixture comprising α-methylstyrene and acrylonitrile, the improvement comprising conducting said copolymerization in the presence of 0.05 to 3.5% by weight of at least one tetrafunctional peroxide of the general formula (I):

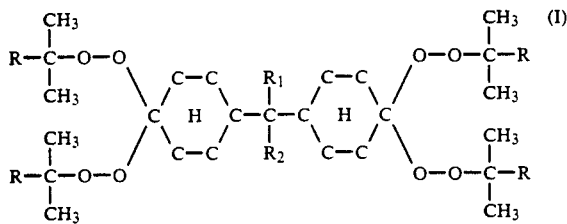

wherein
R is a $C_1$-$C_5$ alkyl group or a phenyl group;
$R_1$ is a $C_1$-$C_2$ alkyl group; and
$R_2$ is a $C_1$-$C_2$ alkyl group.

13. In a process for preparing a toner resin copolymer by copolymerizing a polymerization mixture comprising 50-90% by weight styrene and 10-50% by weight of an unsaturated acid ester monomer selected from the group consisting of methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, dimethylaminoethyl methacrylate, and diethylaminoethyl methacrylate; the improvement comprising conducting said polymerization in the presence of 0.05 to 3.5% by weight of at least one tetrafunctional peroxide of the general formula (I):

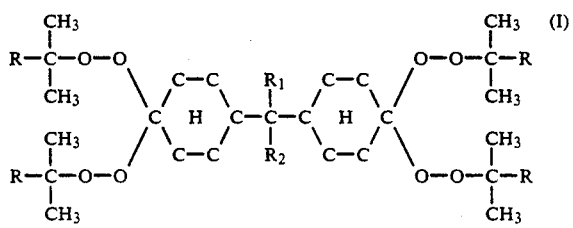

wherein
R is a $C_1$-$C_5$ alkyl group or a phenyl group;
$R_1$ is a $C_1$-$C_2$ alkyl group; and
$R_2$ is a $C_1$-$C_2$ alkyl group.

14. The process of claim 13 wherein said polymerization mixture further comprises at least one comonomer selected from the group consisting of unsaturated acids, acrylonitrile, methacrylonitrile, acrylamide, conjugated dienes, α-methylstyrene and vinyltoluene.

* * * * *

UNITED STATES PATENT AND TRADEMARK OFFICE
CERTIFICATE OF CORRECTION

PATENT NO. : 5,254,650
DATED : October 19, 1993
INVENTOR(S) : Fukumura, Takumi

It is certified that error appears in the above—identified patent and that said Letters Patent is hereby corrected as shown below:

Column 3, formula II, please insert -- (II) -- next to the formula;
Columns 5 and 6:
Table 1, Example 3, please change the Conversion % from "88.4" to -- 99.4 --;

Table 1, Example 6, please change the Peroxide from "2,2-bis(4,4-di-dl-$\alpha$-cumylperoxycyclohexyl)-propane" to -- 2,2-bis(4,4-di-$\alpha$-cumylperoxycyclohexyl)-propane --; and Column 10, Claim 7, line 3, after "weight" please insert -- styrene;--.

Signed and Sealed this

Fifth Day of April, 1994

BRUCE LEHMAN

Attest:

Attesting Officer

Commissioner of Patents and Trademarks